United States Patent [19]

Yamaguchi

[11] Patent Number: 4,901,343
[45] Date of Patent: Feb. 13, 1990

[54] DATA COMMUNICATION APPARATUS

[75] Inventor: Shingo Yamaguchi, Atsugi, Japan

[73] Assignee: Ricoh Company, Ltd., Tokyo, Japan

[21] Appl. No.: 84,731

[22] Filed: Aug. 13, 1987

[30] Foreign Application Priority Data

Aug. 15, 1986 [JP] Japan .................................. 61-190570

[51] Int. Cl.⁴ ......................................... H04M 11/00
[52] U.S. Cl. ....................................... 379/93; 379/97;
 379/100; 379/104; 358/400
[58] Field of Search ....................... 379/93, 96, 97, 98,
 379/100, 102, 104, 105, 106, 107; 358/257, 400

[56] References Cited

U.S. PATENT DOCUMENTS

| | | | |
|---|---|---|---|
| 4,584,434 | 4/1986 | Hashimoto | 379/105 |
| 4,639,553 | 1/1987 | Kiguchi | 358/257 |
| 4,660,218 | 4/1987 | Hashimoto | 379/93 |
| 4,718,082 | 1/1988 | Parker et al. | 379/98 |
| 4,773,080 | 9/1988 | Nakajima et al. | 379/100 |

FOREIGN PATENT DOCUMENTS

| | | | |
|---|---|---|---|
| 0120371 | 7/1983 | Japan | 379/100 |
| 0231964 | 12/1984 | Japan | 379/100 |
| 8707802 | 12/1987 | PCT Int'l Appl. | 379/100 |
| 8510510 | 4/1985 | United Kingdom | 379/100 |

Primary Examiner—Jin F. Ng
Assistant Examiner—Wing F. Chan
Attorney, Agent, or Firm—Oblon, Spivak, McClelland, Maier & Neustadt

[57] ABSTRACT

A dual mode communication apparatus using a telephone line as a transmission line includes a telephone unit and a facsimile unit. A control circuit is also provided to connect either one of the telephone and facsimile units to the telephone line. When a call signal is received from a calling station at a remote location, the control circuit causes the telephone line to be temporarily connected to the facsimile unit, and, at the same time, a predetermined message is transmitted to the calling station. The operator at the calling station, in response to this message, either pushes a facsimile transmission start button or makes a verbal response, such as "hello" and, if the operator at the calling station has responded by a verbal response, such a verbal response is played and thus heard by the operator at the called station. Thus, the operator at the called station now picks up the receiver of the telephone and carries out a dialing (or push button) operation, which then causes the telephone unit to be connected to the telephone line while disconnecting the facsimile unit from the telephone line, whereby a telephone communication mode is established.

12 Claims, 2 Drawing Sheets

DATA COMMUNICATION APPARATUS

BACKGROUND OF THE INVENTION

1. Field of the Invention

This invention generally relates to a data communication apparatus using a telephone network as a transmission line, and, more in particular, to a data communication apparatus having a dual function as a telephone unit and a facsimile unit.

2. Description of the Prior Art

In a small-scale office or at home, it is often the case to use a single telephone line not only for audio communications, but also for data communications for use in personal computers and facsimile machines. In such a case, it is conceivable to provide a structure in which a telephone line normally connected to a telephone unit is switched to a personal computer or a facsimile machine only when data communication is to be carried out. However, in such a structure, when a call is received, it is necessary for the operator to pick up the telephone receiver and ask the caller the object of placing a call. And, if the caller wishes to send information in a data communication mode, the operator has to manually operate a switch to connect the telephone line to a personal computer or facsimile machine. This is cumbersome because it involves a manual operation and the operator has to answer the telephone call every time when a call has been received.

Alternatively, it is also conceivable to connect the telephone line normally to a facsimile machine having an automatic receiving function. In such a case, when the caller wishes to send information in a facsimile transmission mode, desired information may be received by the facsimile machine automatically, so that this is advantageous because the operator at the receiver side is not required to answer a call. In this case, however, a problem arises when the caller wishes to carry out a verbal communication. That is, in such a facsimile machine having an automatic receiving function, when it receives a call in an automatic mode, the facsimile machine repetitively carries out transmission of a predetermined communication procedure signal to the calling station and reception of a response signal from the calling station responsive to that procedural signal. In the present case, however, since such a response signal is not transmitted, the above-mentioned sequential steps of transmission of a transmission procedural signal and establishment of reception of a response signal are repetitively carried out for a predetermined time period, e.g., 30 seconds, and, thereafter, a buzzer for indicating an operator call is activated. Then, at the called station, the operator will recognize that the calling station is requesting a verbal communication by this activation of a buzzer, so that the operator picks up the telephone receiver and then depresses a stop button of the facsimile machine. As a result, the telephone line is switched to the telephone unit, so that a verbal communication can be carried out.

As described above, the caller must wait for a relatively long period of time, e.g., 30 seconds in the above-described example, after having established a connection with the called station so as to establish a verbal communication mode, which is disadvantageous. Accordingly, in the prior art data communication apparatus having a dual function of verbal and data communications, there were various disadvantages, such as requiring to carry out a manual switching operation or a relatively long wait time period.

SUMMARY OF THE INVENTION

In accordance with the principle of the present invention, there is provided a communication apparatus which is capable of using a single telephone line not only for verbal communication, but also for data communication. The present communication apparatus may be used as a unit for verbal communication, such as a telephone unit, and also as a unit for data communication, such as a personal computer or a facsimile machine. In the present communication apparatus, there is required a minimum amount of switching operation for switching between a verbal communication mode and a data communication mode, and, furthermore, a verbal communication mode can be established with a minimum time period.

In accordance with the present invention, there is provided a dual mode communication apparatus having a verbal communication mode and a data communication mode, which is provided with a switching circuit for carrying out switching between a verbal communication unit and a data communication unit and also with a telephone line monitoring circuit which includes a speaker for allowing the operator to listen to a caller's speech. The present communication apparatus is so structured that, if the telephone line is connected to a data communication unit, the telephone line is switched to a telephone communication unit by executing a predetermined dialing operation to the telephone communication unit.

It is therefore a primary object of the present invention to obviate the disadvantages of the prior art and to provide an improved dual mode communication apparatus having a verbal communication mode and a data communication mode.

Another object of the present invention is to provide an improved dual mode communication apparatus which requires a minimum amount of operation in switching between a verbal communication mode and a data communication mode.

A further object of the present invention is to provide an improved dual mode communication apparatus which is capable of carrying out switching between a verbal communication mode and a data communication mode with a minimum time period.

A still further object of the present invention is to provide an improved communication apparatus having a telephone unit and a facsimile unit, which uses a telephone line as a common transmission line.

Other objects, advantages and novel features of the present invention will become apparent from the following detailed description of the invention when considered in conjunction with the accompanying drawings.

DESCRIPTION OF THE PREFERRED EMBODIMENTS

Figure 1:
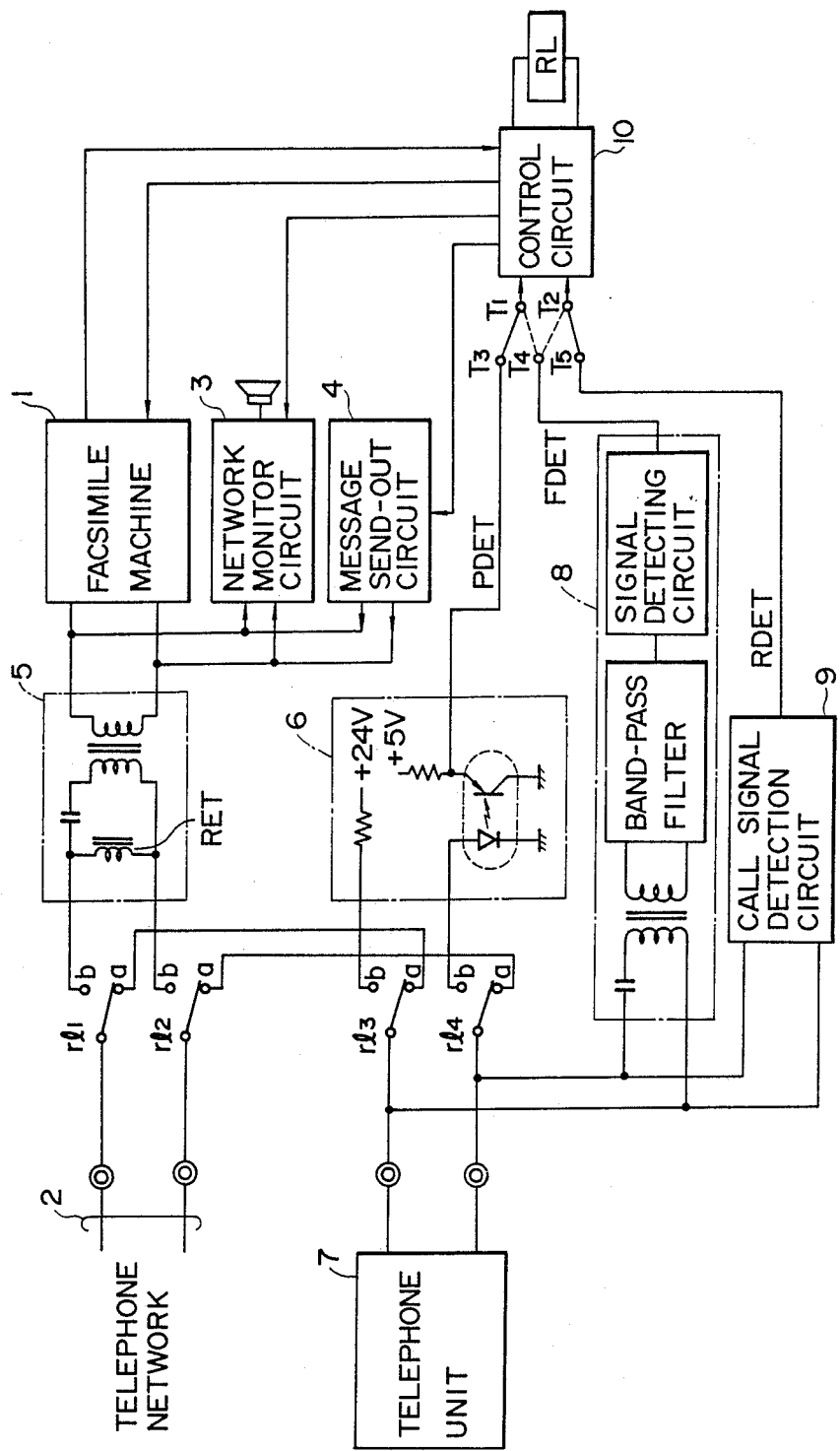
FIG. 1 is a schematic illustration showing the overall structure of a communication apparatus constructed in accordance with one embodiment of the present invention.

Referring now to FIG. 1, there is shown schematically a communication apparatus constructed in accordance with one embodiment of the present invention, which has a dual function of a telephone communication mode and a facsimile communication mode. As shown, the present apparatus includes a facsimile unit 1 which carries out an ordinary facsimile communication using a telephone line 2 and a telephone unit 7. The present apparatus also includes a network monitor circuit 3 which includes a speaker for allowing a caller's speech to be heard by an operator at the present apparatus. Also provided in the present apparatus is a message send-out circuit 4 which stores a predetermined verbal message as recorded on a recording medium, such as recording tape, and the recorded message is transmitted to the caller upon receipt of a call from the caller at a remote calling station.

A coupling circuit 5 is also provided as an interface between such units as facsimile unit 1, network monitor circuit 3 and message send-out circuit 4 and telephone network 2. Also provided in the illustrated apparatus is a dial pulse detecting circuit 6 which may be connected to supply a predetermined d.c. voltage to the telephone unit 7. If the telephone unit 7 is of the dial type telephone, the dial pulse detecting circuit 6 detects a dialing operation by detecting the presence of a discontinuous flow of current through the telephone unit 7 by means of a photo-coupler. Also provided in the present apparatus is a tone detecting circuit 8, which detects the execution of a dialing operation carried out at the telephone unit 7 by detecting a selection signal produced by the telephone unit 7 if the telephone unit 7 is of the push button dialing type, and which also detects a calling signal if the telephone network 2 is a facsimile network.

The present apparatus also includes a call signal detecting circuit 9 which detects a call signal in the case where the telephone line 2 is a subscribed telephone line. Also provided is a control circuit 10 which appropriately drives a relay RL for controlling the conditions of associated switches r11 through r14, thereby establishing a connection between the telephone line 2 and a selected one of facsimile unit 1 and telephone unit 7. The control circuit 10 also controls the operation of each of the above-mentioned components. A plurality of terminals T1 through T5 are also provided, and these terminals are previously connected appropriately depending on the kind of the telephone line 2 and the telephone unit 7. In the illustrated example, the telephone line 2 is a subscribed telephone line and the telephone unit 7 is of the rotating dial type. Thus, as shown in FIG. 1, a connection is established between terminals T1 and T3 and also between terminals T2 and T5.

Figure 2:
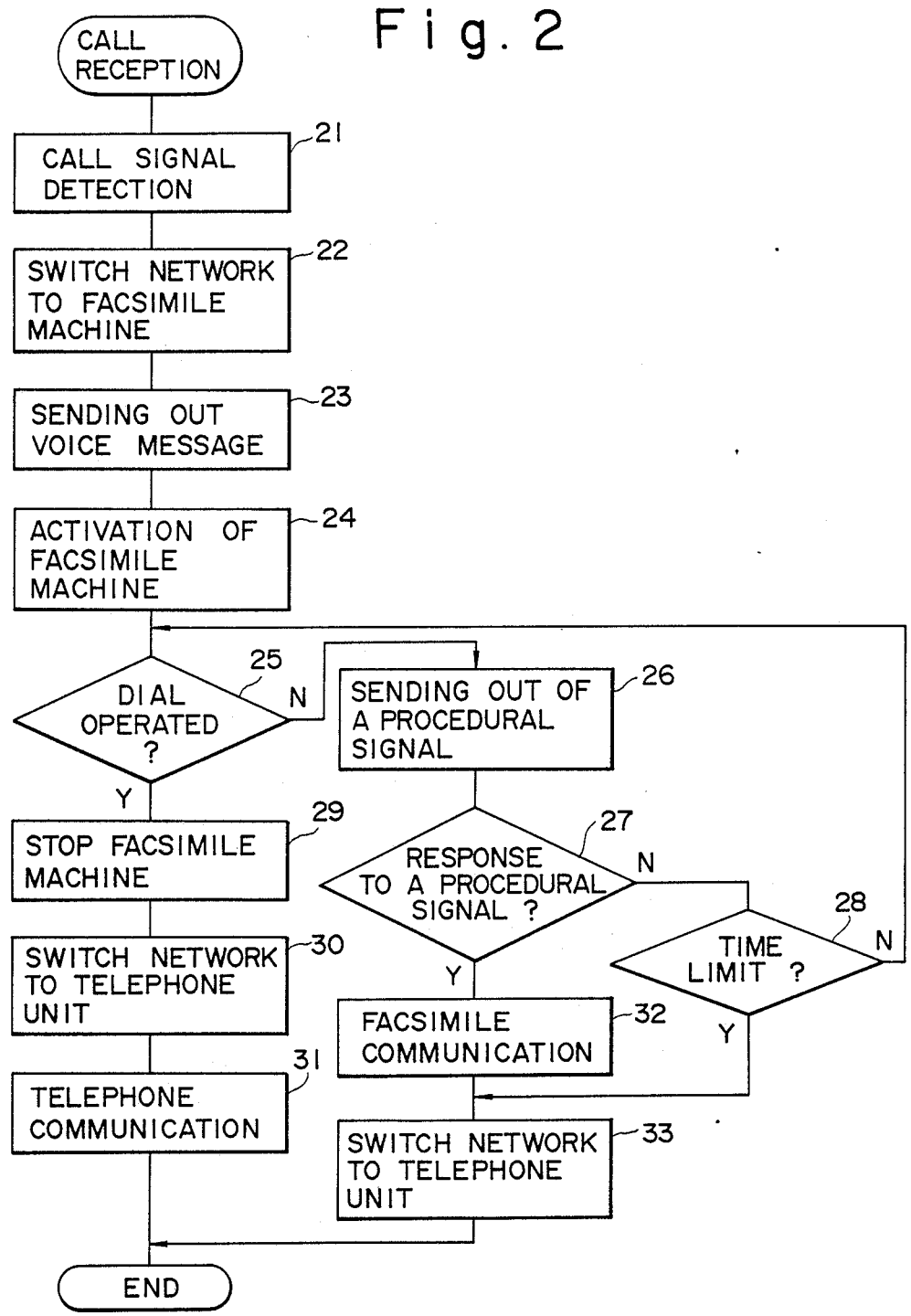
FIG. 2 is a flow chart showing a sequence of steps of operation which can be carried out by the structure shown in FIG. 1.

FIG. 2 illustrates a sequence of steps which may be carried out by the present apparatus shown in FIG. 1 when a call is received from a calling station at a remote location. The control circuit 10 normally keeps the relay RL off or deenergized, so that the associated switches r11 through r14 are connected to respective contacts a as shown in FIG. 1. Thus, the telephone line 2 is connected to the telephone unit 7. Under the conditions, when a call is placed on the telephone line from a calling station at a remote location, a buzzer (not shown) of the telephone line 7 is activated, thereby generating a calling sound. The call signal detecting circuit 9 detects this call signal and thus turns on a call detection signal RDET (step 21). As described before, since the terminals T2 and T5 are connected, this call detection signal RDET is input to the control circuit 10. When an input signal from the terminal T2 is on, the control circuit 10 energizes the relay RL, so that the associated switches r11 through r14 are now connected to contacts b, so that the telephone line 2 is now connected to the facsimile unit 1 through the coupling circuit 5 (step 22). At the same time, the telephone unit 7 is connected to the dial pulse detecting circuit 6.

When the telephone line 2 is connected to the coupling circuit 5, there is defined a loop circuit for a d.c. current component by means of a d.c. loop retaining coil RET to receive a call, thereby allowing to carry out a communication with the calling station in a verbal or data communication mode. At this time, the control circuit 10 causes the message send-out circuit 4 to be activated, so that a verbal message previously recorded on a recording medium, such as a recording tape, is transmitted to the caller via the telephone line 2 from the message send-out circuit 4. For example, the message send-out circuit 4 sends out such a message as "This is such and such (identification of station). After this message, the facsimile unit will issue a signal of "pee(sound)" and it indicates that a facsimile communication can be carried out. If a verbal communication is desired, please say "hello", then the operator will answer." (step 23).

Then, the facsimile unit 1 is activated (step 24). When the facsimile unit 1 is activated, a predetermined communication procedural signal is transmitted to the calling station (from N of step 25 to step 26) and detects another predetermined communication procedural signal as a response from the calling station (step 27). This transmission and detection of a communication procedural signal is repeated for a predetermined time period (from N of step 27 to step 25 via N of step 28). Since the operator at the calling station has listened to the above-described message, if the caller wishes a verbal communication, the caller says "hello" to the telephone unit at the calling station. This "hello" sound is transmitted through the telephone line 2 and is made audible to the operator at the called station by means of the speaker of the network monitor circuit 3. Upon hearing of this "hello" sound, the operator at the called station picks up the receiver of the telephone unit 7 and the operator carries out a dialing operation of an arbitrary number.

The pulse detecting circuit 6, under the circumstances, is supplying a d.c. voltage to the telephone unit 7 through a resistor and monitoring the presence or absence of current to the telephone unit 7 by means of the photo-coupler. Thus, when the dialing operation is carried out with an off-hook condition as described above, the photo-coupler detects the presence of current flowing into the telephone unit 7 to output a pulse detection signal PDET, thereby detecting the fact that the above-described dialing operation has been carried out at the telephone unit 7 (Y of step 25). In the present embodiment, since the terminals T1 and T3 are connected, the pulse detecting signal PDET is input to the control circuit 10. Upon receipt of a signal at the terminal T1, the control circuit 10 terminates the operation of the facsimile unit 1 (step 29), and, then, causes the relay RL to be deenergized. Accordingly, the switches associated with the relay RL are again switched to respective contacts a, so that the telephone line 2 is switched to the telephone unit 7 (step 30). As a result, the operator at the called station of the present apparatus may carry out a verbal communication with the caller at the calling station (step 31). Upon completion of a verbal communication, when the operator places the receiver back in its original position, the original condition prior to reception of a call is restored.

On the other hand, if the caller desires to carry out a facsimile communication, the caller depresses a transmission button of a facsimile unit of the calling station after hearing the "pee" sound. Thus, the facsimile unit 1 of the called station receives a predetermined communication procedural signal from the facsimile unit of the calling station as a response (Y of step 27), so that a facsimile communication can be carried out in an ordinary manner as in the prior art (step 32). Upon completion of a facsimile communication, the facsimile unit 1 outputs a communication end signal to the control circuit 10. Thus, upon receipt of this communication end signal, the control circuit 10 causes the relay RL to be deenergized, thereby causing the associated switches r11 through r14 to switch to respective contacts a, so that the telephone line 2 is switched to the telephone unit 7 and then the operation is terminated (step 33).

As described above, in the illustrated embodiment, when a call is received by the telephone line 2, a predetermined verbal message is first transmitted to the caller, and, thereafter, the facsimile unit 1 is activated and the object of the call is determined by listening to a verbal response from the caller. And, if the caller desires a verbal communication, the operator at the called station picks up the receiver of the telephone unit 7 and then carries out a dialing operation of a desired number, which causes the telephone line 2 to be connected to the telephone unit 7, thereby establishing a verbal communication mode. On the other hand, if the caller wishes a facsimile communication, it is only necessary for the caller to depress the transmission start button of the facsimile unit of the calling station after hearing a predetermined signal, there is established a facsimile communication mode.

Therefore, in accordance with the present invention, it is not necessary for the operator at the called station first to answer a call from the caller to carry out a verbal communication so as to determine what mode of communications the caller desire and then to switch the telephone line to either one of the telephone and facsimile units. Accordingly, in accordance with the present invention, the operation is greatly facilitated and a verbal communication mode can be established as quickly as possible.

In the above-described embodiment, use has been made of the rotating dial type for the telephone unit 7; however, as an alternative, use may also be made of the push button type for the telephone unit 7. In the latter case, however, it must be structured as in the following manner. That is, a band-pass filter for detecting a signal of a particular frequency which is output when any of the push buttons of the telephone unit 7 has been depressed is provided in the tone detecting circuit 8, which thus outputs the tone detecting signal FDET upon detection of the signal of a particular frequency through the band-pass filter. In addition, a connection should be established between terminals T1 and T4. With this structure, at step 25 in the flow chart of FIG. 2, a voltage is supplied to the telephone unit 7 of the push button dialing type from the pulse detecting circuit 6. Under the condition, when any one of the push buttons of the push phone 7 is depressed, the tone detecting circuit 8 outputs a tone detecting signal FDET. This signal FDET is then supplied to the control circuit 10 through terminal T1, so that the operation as shown in the flow chart of FIG. 2 ensues.

In the above-described embodiment, the telephone line 2 has been described as an ordinary subscribed telephone line. However, the telephone line 2 can be any desired type of communication line. For example, the telephone line 2 may be a NTT (Nippon Telephone and Telegraph Company) facsimile network, in which case, it is so structured to detect a call signal by the tone detecting circuit 8. In this case, the call signal is a tone signal of 1,300 Hz, so that the band-pass filter of the tone detecting circuit 8 should be adjusted to the frequency of 1,300 Hz. In addition, a connection should be established between terminals T2 and T4. With this structure, when a call is received by this network at step 21, the tone detecting circuit 8 detects this call signal and thus outputs a tone detection signal FDET. And, then, this signal FDET is input to the control circuit 10 via terminal T2, so that the sequence of steps shown in the flow chart of FIG. 2 ensues.

In this case, if the band-width of the band-pass filter is so set to pass the above-described frequency 1,300 Hz and a high group frequency of 1,336 Hz of a selection signal of a push button dialing type telephone unit, the tone detecting circuit 8 may be used commonly for detection of a call signal from a calling station and for detection of a dialing operation of the telephone unit 7 of the push button dialing type.

It is to be noted that the message send-out circuit 4 of the above-described embodiment may be discarded if the caller is well aware how to use this communication apparatus. Moreover, it should also be noted that, although it has been described as to the case of carrying out data communication using a facsimile machine, the present invention is equally applicable to other types of data communication using personal computers and other data communication equipment connected to a MODEM in place of the facsimile unit 1. Also in this case, similarly with the case of a facsimile unit, it is so structured that a personal computer or any other type of data communication equipment used initiates transmission of data upon receipt of a response signal from the calling station, which, in turn, is transmitted from the calling station in response to a particular signal transmitted from the called station to the calling station.

As described above in detail, in accordance with the present invention, there is provided a communication apparatus which includes a switching circuit for selectively connecting a telephone line to either one of a telephone unit and a data communication unit, such as a facsimile unit, and a network monitor circuit having a speaker which allows to listen to a caller's speech. With this structure, upon receipt of a call, the telephone line is switchingly connected to the data communication unit temporarily. Then, if the operator at the called station hears a caller's request for verbal communication through the speaker, the operator carries out a dialing operation (including push button operation) of an arbitrary or predetermined number at the telephone unit, which then causes the telephone line to be switchingly connected to the telephone unit, thereby establishing a verbal communication mode. Thus, the manual switching operation required for the operator is minimized and facilitated, and a verbal communication mode can be established as quickly as possible as compared with the prior art.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A communication apparatus for use as being connected to a telephone line, comprising:
   a first communication unit of a first kind, said first communication unit being connectable to said telephone line;
   a second communication unit of a second kind which is different from said first kind, said second communication unit being connectable to said telephone line;
   detecting means for detecting a call signal from a calling station at a remote location on said telephone line;
   sending means for sending a predetermined message;
   monitoring means for monitoring an oral response of a caller at said station in response to said predetermined message, said monitoring means including generating means for generating a sound of said caller's oral response; and
   control means responsive to a call detection signal from said detecting means for causing said first communication unit to be connected to said telephone line and said sending means to send said predetermined message to said calling station, said control means causing said second communication unit to be connected to said telephone line while causing said first communication unit to be disconnected from said telephone line if an operator carries out a predetermined dialing operation to said second communication unit in response to said sound of said caller's response generated by said generating means after said first communication unit has been connected to said telephone line in response to said call detection signal.

2. Apparatus of claim 1 wherein said first communication unit is a data communication unit for transmitting or receiving data through said telephone line and said second communication unit is a telephone unit.

3. Apparatus of claim 2 wherein said data communication unit is a facsimile unit for transmitting or receiving image data through said telephone line.

4. Apparatus of claim 2 wherein said telephone unit is of the rotating dial type.

5. Apparatus of claim 2 wherein said telephone unit is of the push button type.

6. Apparatus of claim 1 further comprising:
   first switch means interposed between said telephone line and said first communication unit;
   second switch means interposed between said telephone line and said second communication unit; and
   whereby said control means is operatively coupled to said first and second switch means such that said control means controls said first and second switch means to take a first state in which said telephone line is connected to said first communication unit or to take a second state in which said line is connected to said second communication unit.

7. Apparatus of claim 6 wherein said control means includes a relay which is operatively coupled to said first and second switch means, whereby said first and second switch means take said first state when said relay is set in a selected one of an energized or deenergized state and said first and second switch means take said second state when said relay is set in the other of said energized or deenergized state.

8. A communication apparatus for use as being connected to a telephone line, comprising:
   a data communication unit for transmitting or receiving data through said telephone line, said data communication unit being connectable to said telephone line;
   a telephone unit connectable to said telephone line;
   detecting means for detecting a call signal from a calling station at a remote location on said telephone line; and
   control means responsive to a call detection signal from said detecting means for causing said data communication unit to be connected to said telephone line, said control means causing said telephone unit to be connected to said telephone line, after said data communication unit is connected to said telephone line in response to said call detection signal, if an operator has picked up a handset of said telephone unit and carries out a dialing operation.

9. Apparatus of claim 8 wherein said dialing operation is to dial any number.

10. Apparatus of claim 8 wherein said dialing operation is an operation to rotate a dial of any desired number.

11. Apparatus of claim 8 wherein said dialing operation is an operation to push a button of any desired number.

12. Apparatus of claim 2 wherein said telephone unit is connected to receive a predetermined d.c. voltage and also to a photo-coupler when said data communication unit is connected to said telephone line by said control means.

* * * * *